United States Patent
Shimokawa

(10) Patent No.: US 7,650,578 B2
(45) Date of Patent: Jan. 19, 2010

(54) DISPLAY CONTROL APPARATUS AND METHOD, RECORDING MEDIUM, AND PROGRAM

(75) Inventor: Ryoko Shimokawa, Tokyo (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 11/294,388

(22) Filed: Dec. 6, 2005

(65) Prior Publication Data

US 2006/0123343 A1 Jun. 8, 2006

(30) Foreign Application Priority Data

Dec. 8, 2004 (JP) ............................. P2004-354935

(51) Int. Cl.
*G06F 3/048* (2006.01)
(52) U.S. Cl. .................. 715/838; 715/712; 715/730
(58) Field of Classification Search .................. 715/712, 715/730, 838
See application file for complete search history.

(56) References Cited

U.S. PATENT DOCUMENTS 6,636,648 B2 * 10/2003 Loui et al. .................. 382/284
6,771,801 B1 * 8/2004 Fisher et al. ................ 382/112
6,781,575 B1 * 8/2004 Hawkins et al. ............ 345/173
2002/0040375 A1 * 4/2002 Simon et al. ................ 707/517

FOREIGN PATENT DOCUMENTS

| JP | 08-195927 | 7/1996 |
|---|---|---|
| JP | 11-205719 | 7/1999 |
| JP | 2002-101329 | 4/2002 |
| JP | 2003-76772 | 3/2003 |
| JP | 2004-104373 | 4/2004 |

* cited by examiner

*Primary Examiner*—Dennis-Doon Chow
*Assistant Examiner*—Sajeda Muhebbullah
(74) *Attorney, Agent, or Firm*—Finnegan, Henderson, Farabow, Garrett & Dunner, L.L.P.

(57) ABSTRACT

A display control apparatus includes an image creating section creating a first image having a predetermined number of drawing areas each onto which a thumbnail image is drawn, and an erasing section erasing at least one drawing area from the first image in response to an instruction from a user to display the first image. The number of drawing areas erased is the same as a number that is determined by subtracting the number of thumbnail images to be drawn in the first image from the predetermined number of drawing areas of the first image. The apparatus also includes a drawing section drawing a thumbnail image in each of the unerased drawing areas remaining in the first image, and a display controlling section controlling display of the first image including the thumbnail image drawn in each drawing area.

9 Claims, 10 Drawing Sheets

DISPLAY CONTROL APPARATUS AND METHOD, RECORDING MEDIUM, AND PROGRAM

CROSS REFERENCES TO RELATED APPLICATIONS

The present invention contains subject matter related to Japanese Patent Application JP 2004-354935 filed in the Japanese Patent Office on Dec. 8, 2004, the entire contents of which are incorporated herein by reference.

BACKGROUND OF THE INVENTION

1. Field of the Invention

The present invention relates to a display control apparatus and method, a recording medium, and a program. More specifically, the present invention relates to a display control apparatus and method, a recording medium, and a program for allowing more rapid display of a view including thumbnail images.

2. Description of the Related Art

For example, when a predetermined image that is taken using a digital still camera or a digital video camera and that is recorded in a recording medium is to be displayed, a list of images recorded in the recording medium are generally displayed. It is difficult to search for the desired image based on only the file name of a file storing data of the image if a great number of images are recorded. In order to overcome such inconvenience, smaller images, or thumbnail images, of the images are created, and an index image including the thumbnail images is displayed.

The user selects one of the thumbnail images displayed in the index image to view the image of the selected thumbnail image in full size on a screen of a display device.

FIG. 1 is a flowchart showing an index image creating process of the related art. In step S1, a template image is obtained. The template image is a model image on which an index image can be based. In step S1, therefore, in the image display device, for example, a template image that is stored in advance in a read-only memory (ROM) is loaded (or stored) into a random access memory (RAM).

FIG. 2 shows a template image 11. The template image 11 includes a display area 12 to display thumbnail images. The template image 11 also includes icons 21-1 and 21-2. For example, the user selects the icon 21-1 to return to the previous page of the template image 11 (i.e., the previous view of the template image 11), and selects the icon 21-2 to advance to the next page (i.e., the next view of the template image 11).

In step S2, a desired number of thumbnail areas (e.g., thumbnail areas 41-1 to 41-6 shown in FIG. 3) used as areas onto which thumbnail images are drawn are created in the template image 11. For example, when there are four thumbnail images, four thumbnail areas are created in the template image 11.

FIG. 3 shows the template image 11 in which the thumbnail areas 41-1 to 41-6 are created. The thumbnail areas 41-1 to 41-6 are areas onto which thumbnail images are drawn, and are shown in black.

In step S3, thumbnail images are drawn in the thumbnail areas 41-1 to 41-6 of the template image 11.

After the processing of step S3, the process ends.

For example, the template image 11 shown in FIG. 3 has a capacity of up to six thumbnail images. When eight thumbnail images are to be displayed in the template image 11, first, the thumbnail areas 41-1 to 41-6 are created in the template image 11, and thumbnail images are drawn in the created thumbnail areas 41-1 to 41-6.

When the user selects the icon 21-2, the thumbnail areas 41-1 and 41-2 are created in the template image 11, and thumbnail images are drawn in the created thumbnail areas 41-1 and 41-2.

Recently, graphical user interface (GUI) index images (hereinafter referred to as "GUI images", if necessary) including a plurality of thumbnail images have become diversified and complicated.

An exemplary technique based on a GUI image using thumbnail images is disclosed in, for example, Japanese Unexamined Patent Application Publication No. 2004-104373. In this technique, a thumbnail image list is provided. In this thumbnail image list, thumbnail images of a captured still image, a moving image, and a fixed-point observation image that is a collection of a plurality of still images captured a plurality of times for a certain period of time are displayed so that the captured still image, the moving image, and the fixed-point observation image can be totally managed.

SUMMARY OF THE INVENTION

With the diversity and complexity of GUI images using thumbnail images, the amount of image data has been increased. In order to store the increased amount of image data, a large-capacity ROM is needed, and an expensive device is therefore needed.

One approach for overcoming the foregoing problems is to separate a GUI image including thumbnail images into elements and to record the elements as data parts. The recorded data parts are further compressed, thereby reducing the amount of image data corresponding to the GUI image.

Compressed (encoded) data parts of a GUI image are decoded, and thereafter the GUI image is created. Therefore, a long time is needed to create the GUI image.

Another approach is that GUI images to be displayed frequently are created at a predetermined timing and are stored (held) in a RAM, and, when a desired GUI image is displayed, the image is copied to another storage area of the RAM, thereby reducing the time required for creating the GUI image.

However, the approach in which GUI images are created and stored in advance in a RAM makes it difficult to store image data corresponding to a large number of GUI images because of the limited storage capacity of the RAM. It is therefore difficult to store image data corresponding to multiple-pattern GUI images.

When a GUI image including portions which are changed in design is to be actually displayed, images corresponding to the design-changed portions in the GUI image are added after the stored image data is copied. A longer time is thus needed.

An index image showing a list of thumbnail images is often spread over several pages because of the limited number of thumbnail images that can be displayed in one page.

Even with the efficient use of the aforementioned approaches, the number of thumbnail images displayed in a page is variable. In the index image creating method of the related art, a number of areas (thumbnail areas) in which thumbnail images are shown later are created corresponding to the number of thumbnail images in each page, which is time-consuming.

It is therefore desirable to more rapidly display an image including thumbnail images without a large-capacity storage device.

A display control apparatus according to an embodiment of the present invention includes the following elements. Image creating means creates a first image having a predetermined number of drawing areas each onto which a thumbnail image is drawn. Erasing means erases at least one drawing area from the first image in response to an instruction from a user to display the first image, the number of drawing area erased by the erasing means being the same as a number that is determined by subtracting the number of thumbnail images to be drawn in the first image from the predetermined number of drawing areas of the first image. Drawing means draws a thumbnail image in each of the remaining drawing areas of the first image from which the at least one drawing area is erased by the erasing means. Display controlling means controls display of the first image including the thumbnail image drawn in each drawing area.

The display control apparatus may further include area creating means for creating at least one drawing area in a second image having no drawing areas when the number of thumbnail images to be drawn in the first image is smaller than the predetermined number of drawing areas of the first image and is smaller than a predetermined number, the number of drawing areas created by the area creating means corresponding to the number of thumbnail images to be drawn, the second image being created by the image creating means. The drawing means may draw a thumbnail image in each of the at least one drawing area created in the second image by the area creating means.

A display control method according to an embodiment of the present invention includes the steps of creating an image having a predetermined number of drawing areas each onto which a thumbnail image is drawn, erasing at least one drawing area from the image in response to an instruction from a user to display the image, the number of drawing areas erased in the step of erasing being the same as a number that is determined by subtracting the number of thumbnail images to be drawn in the image from the predetermined number of drawing areas of the image, drawing a thumbnail image in each of the remaining drawing areas of the image from which the at least one drawing area is erased in the step of erasing, and controlling display of the image including the thumbnail image drawn in each drawing area.

A recording medium according to an embodiment of the present invention records a program including the steps of creating an image having a predetermined number of drawing areas each onto which a thumbnail image is drawn, erasing at least one drawing area from the image in response to an instruction from a user to display the image, the number of drawing areas erased in the step of erasing being the same as a number that is determined by subtracting the number of thumbnail images to be drawn in the image from the predetermined number of drawing areas of the image, drawing a thumbnail image in each of the remaining drawing areas of the image from which the at least one drawing area is erased in the step of erasing, and controlling display of the image including the thumbnail image drawn in each drawing area.

A program according to an embodiment of the present invention causes a computer to perform the steps of creating an image having a predetermined number of drawing areas each onto which a thumbnail image is drawn, erasing at least one drawing area from the image in response to an instruction from a user to display the image, the number of drawing areas erased in the step of erasing being the same as a number that is determined by subtracting the number of thumbnail images to be drawn in the image from the predetermined number of drawing areas of the image, drawing a thumbnail image in each of the remaining drawing areas of the image from which the at least one drawing area is erased in the step of erasing, and controlling display of the image including the thumbnail image drawn in each drawing area.

According to a display control apparatus, a display control method, a program recorded in a recording medium, and a program according to an embodiment of the present invention, an image having a predetermined number of drawing areas each onto which a thumbnail image is drawn is created. In response to an instruction from a user to display the image, a number of drawing areas that is the same as a number given by subtracting the number of thumbnail images to be drawn in the image from the predetermined number of drawing areas of the image are erased from the image. A thumbnail image is drawn in each of the unerased drawing areas of the image, and display of the image including the thumbnail image drawn in each drawing area is controlled.

Therefore, an image including thumbnail images can be created. Moreover, an image including thumbnail images can be more rapidly displayed without a large-capacity storage device.

DESCRIPTION OF THE PREFERRED EMBODIMENTS

Figure 1:
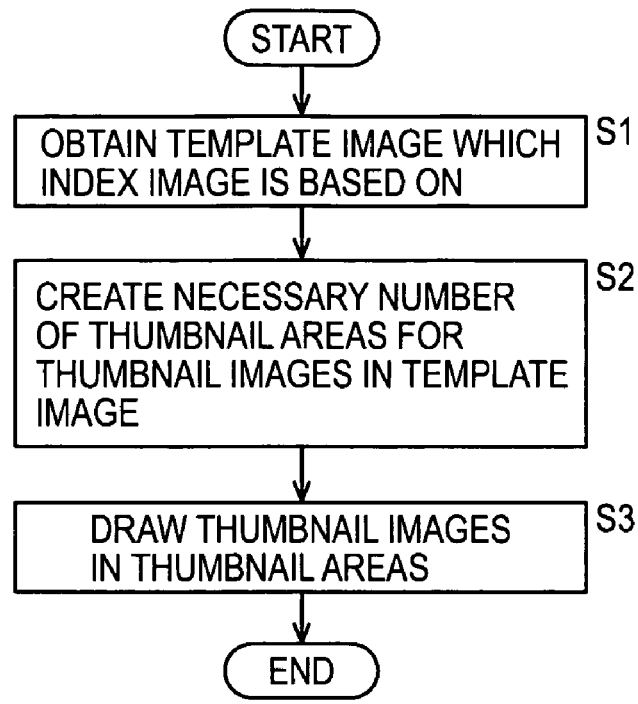
FIG. 1 is a flowchart showing an index image creating process of the related art.
Figure 2:
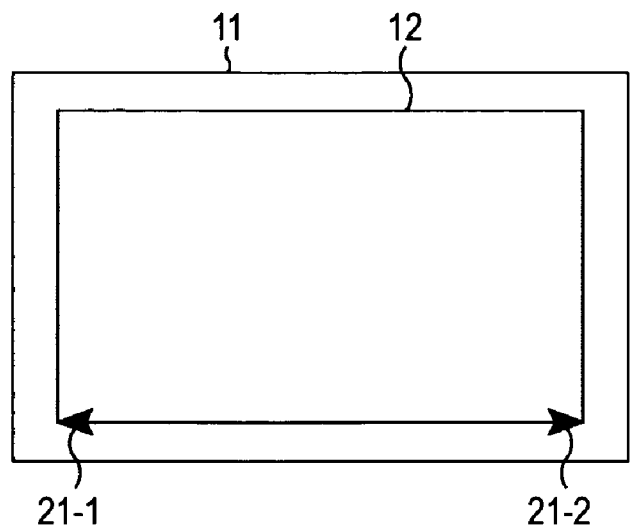
FIG. 2 is an illustration of a template image.
Figure 3:
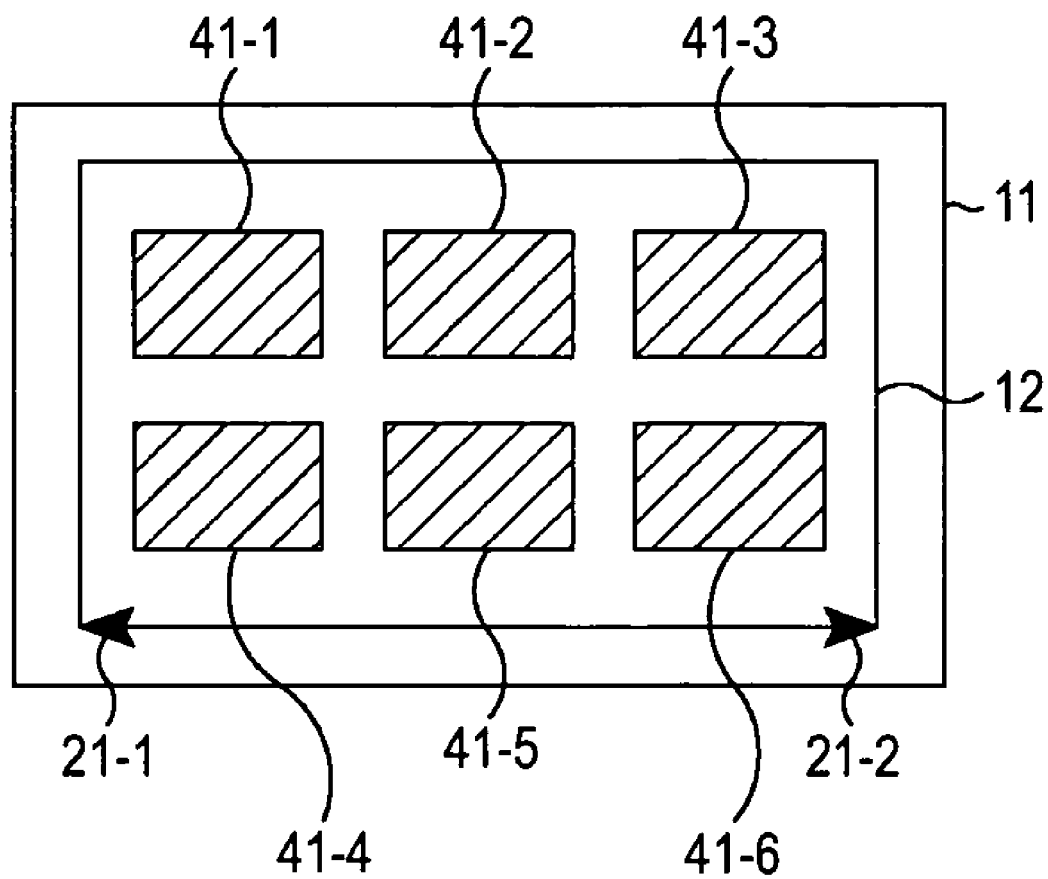
FIG. 3 is an illustration of a template image having thumbnail areas.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

In an embodiment of the present invention, a display control apparatus (e.g., a digital still camera 100 shown in FIG. 4) includes image creating means (e.g., a template image creating section 211 shown in FIG. 5) for creating a first image (e.g., a template image 251 shown in FIG. 7) having a predetermined number of drawing areas (e.g., a thumbnail areas 271-1 to 271-8 shown in FIG. 7) each onto which a thumbnail image is drawn, erasing means (e.g., a thumbnail area erasing section 215 shown in FIG. 5) for erasing at least one drawing area from the first image in response to an instruction from a user to display the first image, the number of drawing areas erased by the erasing means being the same as a number that is determined by subtracting the number of thumbnail images to be drawn in the first image from the predetermined number of drawing areas of the first image, drawing means (e.g., a thumbnail image drawing section 214 shown in FIG. 5) for drawing a thumbnail image in each of the remaining drawing areas of the first image from which the at least one drawing area is erased by the erasing means, and display controlling means (e.g., a display controlling section 217 shown in FIG. 5) for controlling display of the first image including the thumbnail image drawn in each drawing area.

In an embodiment of the present invention, the display control apparatus further includes area creating means (e.g., a thumbnail area creating section 292 shown in FIG. 11) for creating at least one drawing area (e.g., thumbnail areas 331-1 and 331-2 shown in FIG. 15) in a second image (e.g., a template image 301 shown in FIG. 13) having no drawing areas when the number of thumbnail images to be drawn in the first image is smaller than the predetermined number of drawing areas of the first image and is smaller than a predetermined number, the number of drawing areas created by the area creating means corresponding to the number of thumbnail images to be drawn, the second image being created by the image creating means, wherein the drawing means draws a thumbnail image in each of the at least one drawing area created in the second image by the area creating means.

In an embodiment of the present invention, a display control method for a display control apparatus (e.g., a digital still camera 100 shown in FIG. 4) includes the steps of creating (e.g., step S51 shown in FIG. 6) an image (e.g., a template image 251 shown in FIG. 7) having a predetermined number of drawing areas (e.g., thumbnail areas 271-1 to 271-8 shown in FIG. 7) each onto which a thumbnail image is drawn, erasing (e.g., step S105 shown in FIG. 9) at least one drawing area from the image in response to an instruction from a user to display the image, the number of drawing areas erased in the step of erasing being the same as a number that is determined by subtracting the number of thumbnail images to be drawn in the image from the predetermined number of drawing areas of the image, drawing (e.g., step S103 shown in FIG. 9) a thumbnail image in each of the remaining drawing areas of the image from which the at least one drawing area is erased in the step of erasing, and controlling (e.g., step S72 shown in FIG. 8) display of the image including the thumbnail image drawn in each drawing area.

In an embodiment of the present invention, a program recorded in a recording medium is a program for display control for a display control apparatus (e.g., a digital still camera 100 shown in FIG. 4) includes the steps of creating (e.g., step S51 shown in FIG. 6) an image (e.g., a template image 251 shown in FIG. 7) having a predetermined number of drawing areas (e.g., thumbnail areas 271-1 to 271-8 shown in FIG. 7) each onto which a thumbnail image is drawn, erasing (e.g., step S105 shown in FIG. 9) at least one drawing area from the image in response to an instruction from a user to display the image, the number of drawing areas erased in the step of erasing being the same as a number that is determined by subtracting the number of thumbnail images to be drawn in the image from the predetermined number of drawing areas of the image, drawing (e.g., step S103 shown in FIG. 9) a thumbnail image in each of the remaining drawing areas of the image from which the at least one drawing area is erased in the step of erasing, and controlling (e.g., step S72 shown in FIG. 8) display of the image including the thumbnail image drawn in each drawing area.

In an embodiment of the present invention, a program for causing a computer of a display control apparatus (e.g., a digital still camera 100 shown in FIG. 4) to perform display control includes the steps of creating (e.g., step S51 shown in FIG. 6) an image (e.g., a template image 251 shown in FIG. 7) having a predetermined number of drawing areas (e.g., thumbnail areas 271-1 to 271-8 shown in FIG. 7) each onto which a thumbnail image is drawn, erasing (e.g., step S105 shown in FIG. 9) at least one drawing area from the image in response to an instruction from a user to display the image, the number of drawing areas erased in the step of erasing being the same as a number that is determined by subtracting the number of thumbnail images to be drawn in the image from the predetermined number of drawing areas of the image, drawing (e.g., step S103 shown in FIG. 9) a thumbnail image in each of the remaining drawing areas of the image from which the at least one drawing area is erased in the step of erasing, and controlling (e.g., step S72 shown in FIG. 8) display of the image including the thumbnail image drawn in each drawing area.

An embodiment of the present invention will now be described below with reference to the drawings.

Figure 4:
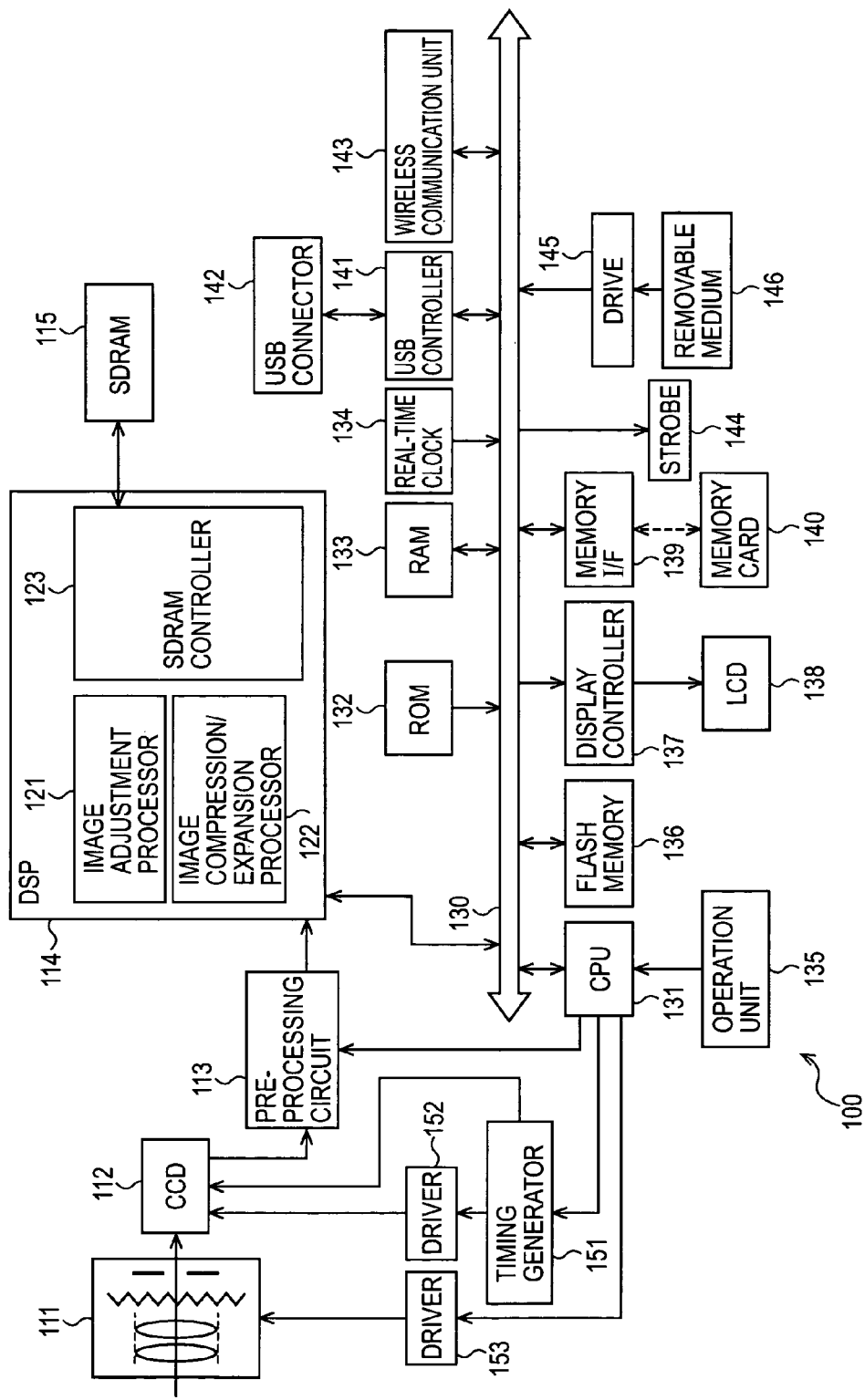
FIG. 4 is a block diagram of a digital still camera according to an embodiment of the present invention.

FIG. 4 is a block diagram of a digital still camera 100 according to an embodiment of the present invention.

The digital still camera 100 includes a lens unit 111 having a lens and a diaphragm mechanism. Light from an object (not shown) is directed through the lens unit 111 to a charge-coupled device (CCD) image sensor 112 for photoelectric conversion.

A video signal output from the CCD image sensor 112 is supplied (input) to a pre-processing circuit 113. The pre-processing circuit 113 performs correlated double sampling on the input signal to remove noise, and adjusts the gain of the noise-removed signal. The pre-processing circuit 113 further converts the gain-adjusted signal (which is an analog signal) into a digital signal, and outputs it to a digital signal processor (DSP) 114.

The DSP 114 includes an image adjustment processor 121, an image compression/expansion processor 122, and a synchronous dynamic random access memory (SDRAM) controller 123.

The DSP 114 generates control signals for auto focus (AF), auto exposure (AE), auto white balance (AWB), etc., based on the input signal using the image adjustment processor 121, and supplies these control signals to a central processing unit (CPU) 131 via a bus 130. The DSP 114 further compresses or expands (decompresses) the input image signal using the image compression/expansion processor 122. The image compression/expansion processor 122 performs the processing while temporarily storing the video signal in an SDRAM 115 that is controlled by the SDRAM controller 123 in the DSP 114.

The image data compressed by the image compression/expansion processor 122 is supplied to a RAM 133 or the like via the bus 130.

The CPU 131 controls components or performs various types of processing according to a program stored in a ROM 132 or a program loaded into the RAM 133 from a flash memory 136. The RAM 133 also stores data necessary for the CPU 131 to perform various types of processing, if necessary.

An operation unit 135 that receives operations from a user is further connected to the CPU 131. The operation unit 135 includes various buttons (not shown), such as a release button and a menu button, and dials and knobs for setting the aperture, the shutter speed, zoom-in/zoom-out, focusing, etc. When the user operates the operation unit 135, the operation unit 135 receives the operation from the user, and supplies the operation information to the CPU 131. The CPU 131 performs processing according to the operation information.

The CPU 131, the ROM 132, and the RAM 133 are connected to one another via the bus 130. A real-time clock 134 that outputs the current date and time (i.e., data indicating the current date and time), the flash memory 136 constructed by a non-volatile semiconductor memory or the like, a display controller 137 that controls an image to be displayed on a liquid crystal display (LCD) 138, and a memory interface (I/F) 139 to which a memory card 140 is attached are also connected to the bus 130.

A USB (Universal Serial Bus) controller 141 that controls a USB connector 142 to be connected with a USB cable (not shown), a wireless communication unit 143 that performs wireless communication with other devices according to the wireless communication standard, such as IEEE 801.11, to supply the image data loaded by the CCD image sensor 112 to other devices or to receive image data from other devices under the control of, for example, the CPU 131, and a strobe light 144 are further connected to the bus 130.

The display controller 137 includes a built-in video random access memory (VRAM) (not shown). The display controller 137 stores the image data loaded by the CCD image sensor 112 into the built-in VRAM, and causes an image corresponding to the image data stored in the VRAM or an image corresponding to image data stored in another memory (such as the RAM 133, the flash memory 136, or the memory card 140 connected to the memory I/F 139) to be displayed on the LCD 138.

A drive 145 is further connected to the bus 130 via an interface (not shown), if necessary. A computer program is read from a removable medium 146 attached to the drive 145, such as a magnetic disc, an optical disc, a magneto-optical disc, or a semiconductor memory, and is installed into the flash memory 136 or the like. A computer program is also read from the memory card 140 attached to the memory I/F 139, and is installed into the flash memory 136 or the like, if necessary.

The CPU 131 controls the operation of the pre-processing circuit 113 based on the operation information input from the user using the operation unit 135, the control information supplied from the image adjustment processor 121, or information obtained by executing various programs.

The CPU 131 also controls a timing generator 151 and a driver 152 that are adapted to control the operation of the CCD image sensor 112. The timing generator 151 and the driver 152 are connected to the CCD image sensor 112, and control the operation of the CCD image sensor 112 under the control of the CPU 131 via a serial control bus.

The CPU 131 further controls a driver 153 that is adapted to control the operation of the lens unit 111, and adjusts the shutter speed or adjusts the diaphragm mechanism.

The timing generator 151 generates a horizontal clock signal and other control signals based on the control signals supplied from the CPU 131, and supplies the generated signals to the CCD image sensor 112 and the driver 152.

The driver 152 generates a vertical control signal based on the control signal supplied from the timing generator 151, and supplies the vertical control signal to the CCD image sensor 112.

The digital still camera 100 is capable of capturing a still image and storing the captured still image into the memory card 140. The digital still camera 100 is also capable of displaying an image file recorded in the memory card 140 on the LCD 138.

The digital still camera 100 is also capable of displaying the captured still image or an image recorded in the memory card 140 or the like in full size on the LCD 138. The digital still camera 100 is also capable of displaying a thumbnail image of the captured still image or an image recorded in the memory card 140 or the like on the LCD 138.

Figure 5:
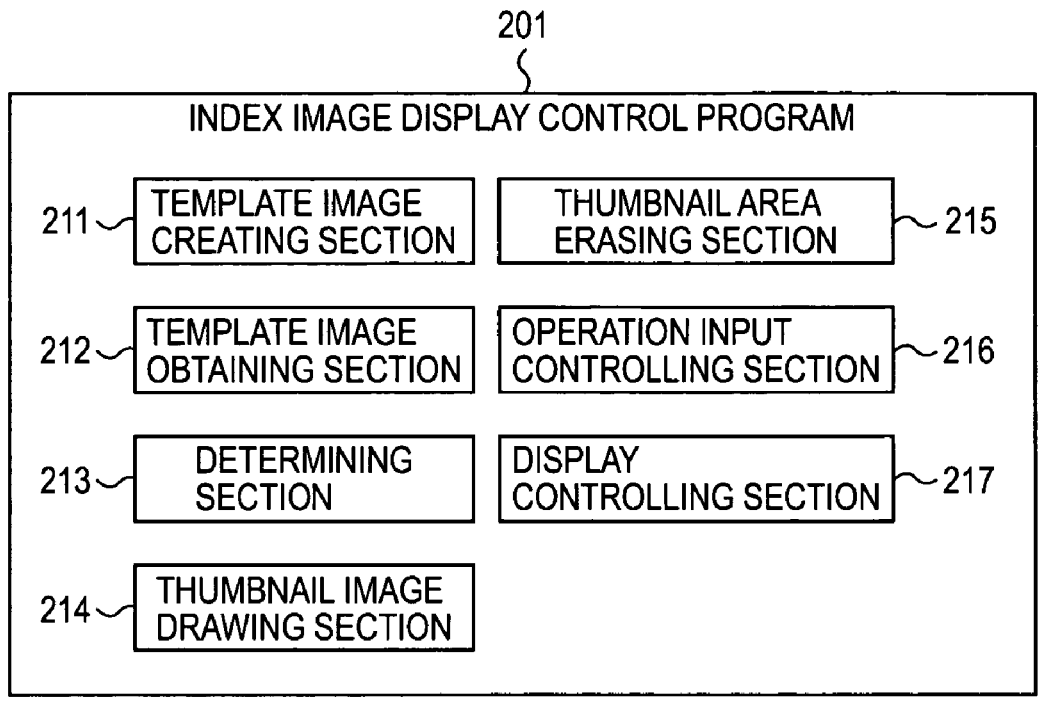
FIG. 5 is a block diagram showing the functional configuration of an index image display control program.

FIG. 5 is a block diagram showing the functional configuration of an index image display control program 201 to be executed by the CPU 131.

The index image display control program 201 creates an index image including thumbnail images. The index image display control program 201 also controls display of the created index image.

The index image display control program 201 includes a template image creating section 211, a template image obtaining section 212, a determining section 213, a thumbnail image drawing section 214, a thumbnail area erasing section 215, an operation input controlling section 216, and a display controlling section 217.

In the following description, a thumbnail image refers to an image of smaller display size than the display size of the original image, which is associated with an image (or image data) to be subjected to appropriate processing, such as reproduction, deletion, or editing. An index image refers to an image including one or a plurality of thumbnail images. A page of the index image refers to a view of the index image or an index view. A template image refers to a model image on which the index image can be based.

For example, when the digital still camera 100 is powered on, the template image creating section 211 creates a template image having a thumbnail area, and holds it in a memory, e.g., the RAM 133. For example, the template image creating section 211 creates a template image from the image data (i.e., data of image parts) stored in the ROM 132 or the flash memory 136. The template image creating section 211 stores the created template image in a predetermined storage region of the RAM 133.

The template image created by the template image creating section 211 includes a predetermined number of thumbnail areas. One thumbnail image is drawn (placed) in each of the thumbnail areas, the details of which are described below.

In response to an instruction from the user to display an index image including thumbnail images, the template image obtaining section 212 copies the template image created by the template image creating section 211 and stored in the RAM 133 to, for example, another storage region of the RAM 133.

The determining section 213 determines whether or not a page switching instruction for the index image has been issued based on an input signal input by the user using the operation unit 135. The determining section 213 further determines whether or not an instructed page of the index image is the last page.

The last page of the index image refers to an index view including thumbnail images that are sorted under predetermined conditions. For example, when thumbnail images of captured images are sorted in the order of the dates on which the images were captured, the last page of an index image is an index view including the thumbnail image of the last (most recently) captured image.

The thumbnail image drawing section 214 draws a thumbnail image in a thumbnail area of the template image.

If the instructed page of the index image is the last page, the thumbnail area erasing section 215 erases a thumbnail area in which no thumbnail image is to be drawn from the template image. In other words, the thumbnail area erasing section 215 erases (deletes) a thumbnail area that is not used for drawing a thumbnail image from the last page of the index image.

The operation input controlling section 216 controls an input signal input from the operation unit 135 by the user operating the operation unit 135.

The display controlling section 217 controls display of the template image in which thumbnail images are drawn, i.e., the index image, on the LCD 138.

A template image creating process performed by the CPU 131 that executes the index image display control program 201 will be described with reference to a flowchart of FIG. 6. The process starts, for example, when the digital still camera 100 is powered on.

In step S51, the template image creating section 211 creates a template image having a thumbnail area on which an index image is based. In step S51, for example, the template image creating section 211 creates a template image having a predetermined number of thumbnail areas using parts constituting a template image stored in advance in the ROM 132 or the flash memory 136.

Figure 7:
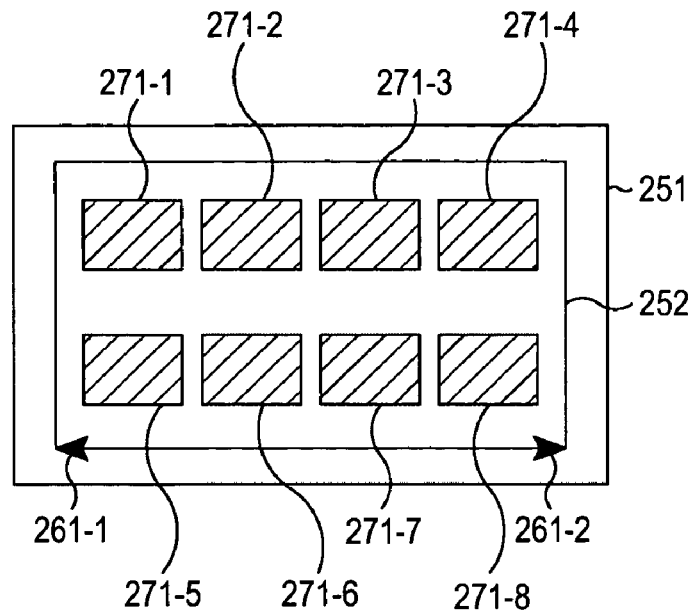
FIG. 7 is an illustration of a template image having thumbnail areas.

FIG. 7 shows an exemplary template image 251 having thumbnail areas 271-1 to 271-8. The template image 251 includes a display area 252 serving as an area in which thumbnail images are displayed.

The template image 251 further includes icons 261-1 and 261-2 (below the display area 252). For example, the user selects the icon 261-1 using the operation unit 135 to return to the previous page of an index image (or the previous index view) (the index image corresponds to the template image 251 in which thumbnail images are drawn in the thumbnail areas), and selects the icon 261-2 to advance to the next page (or the next index view).

In the following description, the icons 261-1 and 261-2 are referred to simply as "icons 261" unless they need to be distinguished from each other.

The thumbnail areas 271-1 to 271-8 are placed in the display area 252 of the template image 251. The thumbnail areas 271-1 to 271-8 are areas onto which thumbnail images are drawn, and are shown in, for example, black by setting the pixel value of the images placed in these areas to 0.

In the following description, the thumbnail areas 271-1 to 271-8 are referred to simply as "thumbnail areas 271" unless they need to be distinguished from one another.

In step S52, the template image creating section 211 stores the template image 251 having the thumbnail areas 271-1 to 271-8 that is created in step S51. In step S52, therefore, the template image creating section 211 stores or holds the created template image 251 in a predetermined storage region of the RAM 133.

After the processing of step S52, the process ends.

An index image displaying process performed by the CPU 131 that executes the index image display control program 201 will be described with reference to a flowchart of FIG. 8. The process starts in response to an instruction from the user to display an index image (i.e., one or a plurality of template images 251 including thumbnail images).

In step S71, an index image creating process is performed. The details of the index image creating process are described below with reference to FIG. 9. As a result of this process, an index image is created.

In step S72, the display controlling section 217 performs control so that the index image created in step S71 is displayed on the LCD 138.

In step S73, the determining section 213 determines whether or not an instruction to display the next page of the index image has been issued. For example, it is determined whether or not the icon 261-2 has been selected when the template image 251 including thumbnail images (i.e., an index view) is currently displayed on the LCD 138.

If it is determined in step S73 that an instruction to display the next page of the index image has not been issued, the process proceeds to step S74, and the determining section 213 determines whether or not an instruction to display the previous page of the index image has been issued. For example, it is determined whether or not the icon 261-1 has been selected when the template image 251 including thumbnail images (i.e., an index view) is currently displayed on the LCD 138.

If it is determined in step S74 that an instruction to display the previous page of the index image has not been issued, the process proceeds to step S75, and the operation input controlling section 216 determines whether or not an instruction to terminate displaying the index image has been issued. For example, when a switch in the operation unit 135 for instructing display of a menu screen is pressed, the operation input controlling section 216 determines that an instruction to terminate displaying the index image has been issued based on the input signal from the operation unit 135.

If it is determined in step S75 that an instruction to terminate displaying the index image has been issued, the process ends.

If it is determined in step S73 that an instruction to display the next page of the index image has been issued, the process returns to step S71, and the processing discussed above is performed.

If it is determined in step S74 that an instruction to display the previous page of the index image has been issued, the process returns to step S71, and the processing discussed above is performed.

If it is determined in step S75 that an instruction to terminate displaying the index image has not been issued, the process returns to step S73, and the processing discussed above is performed.

The index image creating process corresponding to the processing of step S71 shown in FIG. 8 will be described with reference to a flowchart of FIG. 9.

In step S101, the template image obtaining section 212 obtains the template image 251 having the thumbnail areas 271. The template image obtaining section 212 obtains the template image 251 by, for example, keeping (copying) the template image 251 stored in a predetermine storage region of the RAM 133 in step S52 shown in FIG. 6 to a different storage region of the RAM 133 from the storage region used in step S52 shown in FIG. 6.

In step S102, the determining section 213 determines whether or not the obtained template image 251 is an image on which the last page of the index image is based. If it is determined in step S102 that the obtained template image 251 is not an image on which the last page of the index image is based, then, in step S103, the thumbnail image drawing section 214 draws thumbnail images in the thumbnail areas 271-1 to 271-8 of the template image 251.

When the index image has a plurality of pages (or a plurality of the index views), the last page of the index image refers to the last index view of the plurality of index views. When the index image has one page (or one index view), the last page of the index image refers to this index view.

For example, the determining section 213 may compare the order number assigned to each index view with the total number of index views to determine whether or not the obtained template image 251 is an image on which the last page of the index image is based. Alternatively, for example, the determining section 213 may compare the number assigned to each of the thumbnail images placed in this index view with the total number of thumbnail images to determine whether or not the obtained template image 251 is an image on which the last page of the index image is based on.

If it is determined in step S102 that the obtained template image 251 is an image on which the last page of the index image is based, then, in step S104, the thumbnail area erasing section 215 subtracts the number ("n") of thumbnail images to be drawn in the last page of the index image from the number ("m") of the thumbnail areas 271 placed in the template image 251 on which the last page is based, i.e., subtraction of n from m. For example, the number of thumbnail images to be drawn in the last page is subtracted from the number of the thumbnail areas 271, i.e., eight.

In step S105, the thumbnail area erasing section 215 erases (deletes) a number of thumbnail areas corresponding to the number given by subtraction of n from m in step S104.

Figure 10:
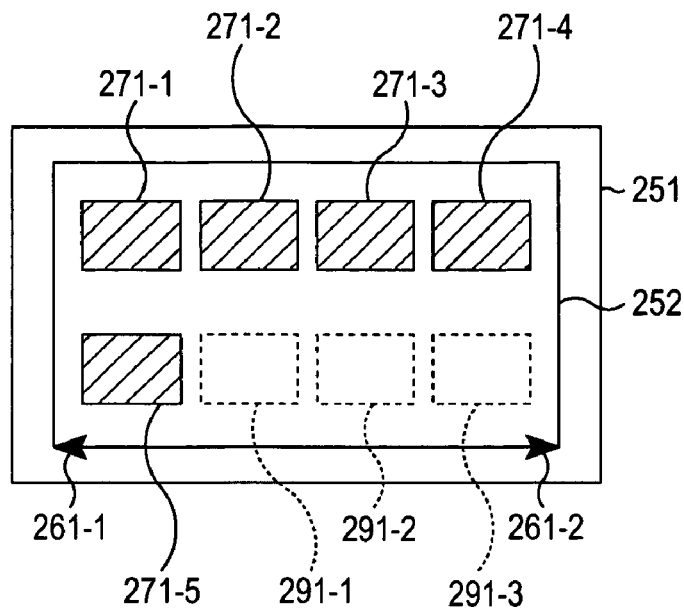
FIG. 10 is an illustration of a template image in which thumbnail areas are erased.

FIG. 10 shows the template image 251 from which certain thumbnail areas 271 are erased. The processing of steps S104 and S105 will now be described with reference to FIG. 10. In the example shown in FIG. 10, the number of thumbnail images to be drawn in the last page (i.e., the template image 251) is five, and the number of thumbnail areas 271 placed in the template image 251 is eight. Thus, in step S104, subtraction of five from eight leaves three. In step S105, therefore, three thumbnail areas, e.g., the thumbnail areas 271-6 to 271-8, are erased from the template image 251.

As shown in FIG. 10, the thumbnail areas 271-6 to 271-8 are erased by, for example, drawing the same color (image) as that of the display area 252. Alternatively, a predetermined image (a certain designed image) indicating that no thumbnail image is displayed may be drawn in areas 291-1 to 291-3 corresponding to the thumbnail areas 271-6 to 271-8.

For example, when the number of thumbnail images to be drawn in the last page (i.e., the template image 251) is eight, since the number of thumbnail areas 271 placed in the template image 251 is also eight, in step S104, subtraction of eight from eight gives 0. Thus, in step S105, none of the thumbnail areas 271 in the template image 251 is erased.

After the processing of step S105, the process proceeds to step S103, where the thumbnail image drawing section 214 draws thumbnail images in the thumbnail areas 271 remaining in the template image 251 which are not erased in step S105, e.g., the thumbnail areas 271-1 to 271-5 of the template image 251.

Figure 8:
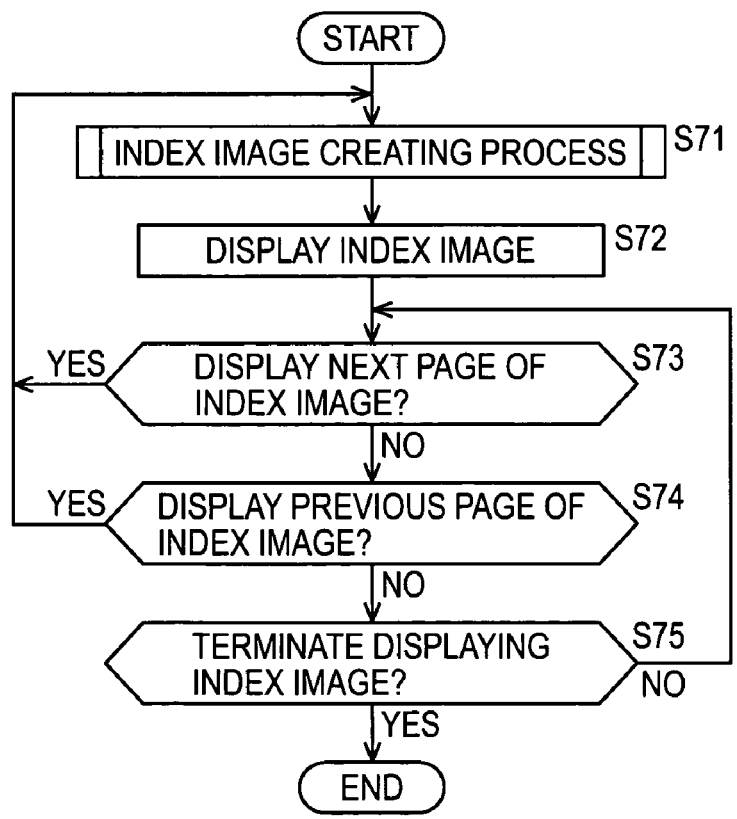
FIG. 8 is a flowchart showing an index image displaying process.

After the processing of step S103, the process returns to step S72 shown in FIG. 8, and the processing discussed above is performed.

In this way, the template image 251 in which the thumbnail areas 271 onto which thumbnail images are drawn are placed in advance is created and stored (held) in a memory. In response to an instruction from the user to display an index image including thumbnail images, thumbnail images are drawn in the thumbnail areas 271.

In the pages other than the last page of the index image, thumbnail images are merely drawn in the thumbnail areas 271 of the template image 251 stored in the memory.

In the last page of the index image, if the number of thumbnail images to be drawn in the last page is smaller than the number of thumbnail areas 271 placed in the template image 251, the thumbnail areas 271 in which no thumbnail image is to be drawn are erased before thumbnail images are drawn in the template image 251.

Accordingly, thumbnail areas are not created each time an instruction to display an index image is issued, but the template image 251 is created and stored in advance in the RAM 133. Thus, a large-capacity storage device is not necessary, and the time required for creating an image including thumbnail images can be reduced. That is, it is possible to more rapidly display an image including thumbnail images without a large-capacity storage device.

Figure 11:
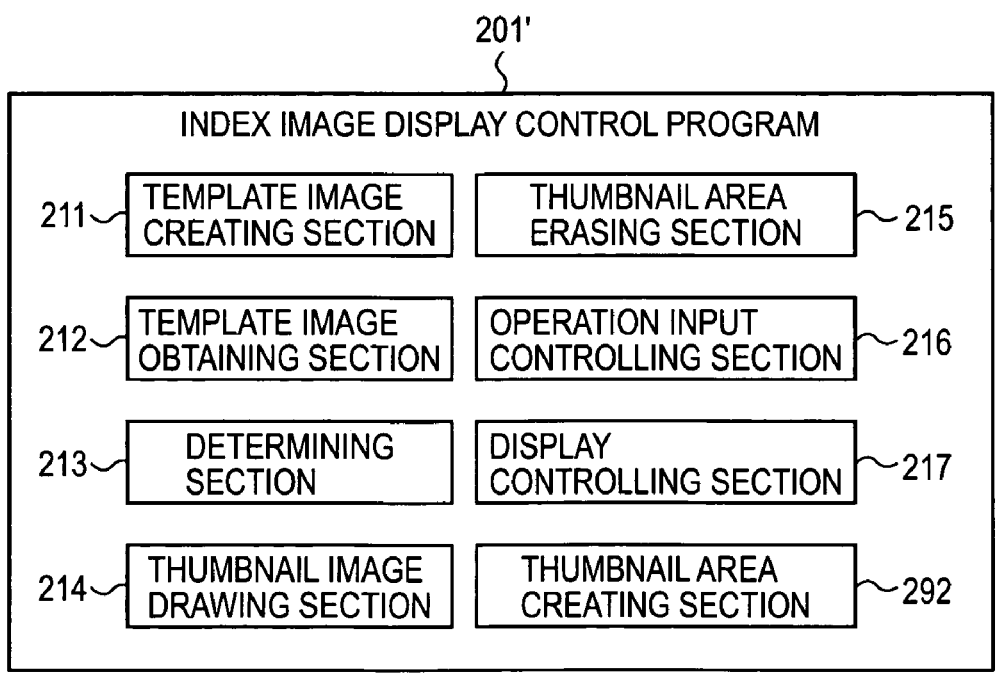
FIG. 11 is a block diagram showing the functional configuration of another index image display control program.

FIG. 11 is a block diagram showing the configuration of another index image display program 201' to be executed by the CPU 131. In the index image display program 201' shown in FIG. 11, similar components to those of the index image program 201 shown in FIG. 5 are denoted by the same reference numerals, and a description thereof is omitted to prevent redundancy.

The index image display control program 201' shown in FIG. 11 includes a template image creating section 211, a template image obtaining section 212, a determining section 213, a thumbnail image drawing section 214, a thumbnail area erasing section 215, an operation input controlling section 216, a display controlling section 217, and a thumbnail area creating section 292.

The template image creating section 211 creates the template image 251 having thumbnail areas and a template image having no thumbnail areas, and holds them in, for example, a predetermined storage region of the RAM 133.

The thumbnail area creating section 292 determines whether or not the number of thumbnail images to be drawn in the last page of the index image is smaller than a predetermined number. When determining that the number of thumbnail images to be drawn in the last page of the index image is smaller than the predetermined number, the thumbnail area creating section 292 creates a number of thumbnail areas corresponding to the number of thumbnail images to be drawn in the last page in the template image having no thumbnail areas that is created by the template image creating section 211.

If the thumbnail area creating section 292 determines that the number of thumbnail images to be drawn in the last page of the index image is smaller than the predetermined number, the template image obtaining section 212 copies the template image having no thumbnail areas that is created by the template image creating section 211 and that is held in the RAM 133 to, for example, another storage region of the RAM 133.

If the thumbnail area creating section 292 determines that the number of thumbnail images to be drawn in the last page of the index image is not smaller than the predetermined number, the template image obtaining section 212 copies the template image 251 having thumbnail areas that is created by the template image creating section 211 and that is held in the RAM 133 to, for example, another storage region of the RAM 133.

Next, a modification of the template image creating process shown in FIG. 6 will be described with reference to a flowchart of FIG. 12. A modification of the index image creating process shown in FIG. 9 will be described with reference to a flowchart of FIG. 14. The index image creating process shown in FIG. 14 corresponds to the processing of step S71 shown in FIG. 8.

Figure 12:
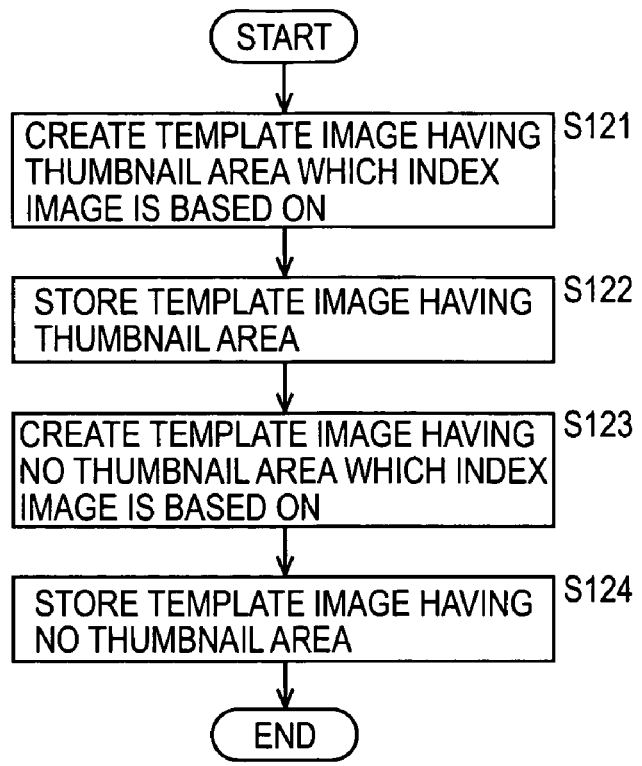
FIG. 12 is a flowchart showing another template image creating process.

FIG. 12 is a flowchart showing another template image creating process performed by the CPU 131 that executes the index image display control program 201' shown in FIG. 11. The process starts, for example, when the digital still camera 100 is powered on.

Figure 6:
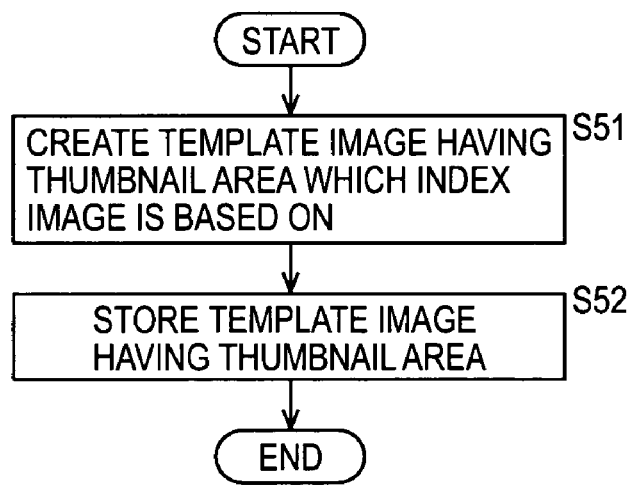
FIG. 6 is a flowchart showing a template image creating process.

The processing of steps S121 and S122 is similar to that of steps S51 and S52 shown in FIG. 6, and a description thereof is thus omitted.

In step S123, the template image creating section 211 creates a template image having no thumbnail areas on which an index image is based. In step S123, for example, the template image creating section 211 creates a template image having no thumbnail areas using parts constituting a template image stored in advance in the ROM 132 or the flash memory 136.

Figure 13:
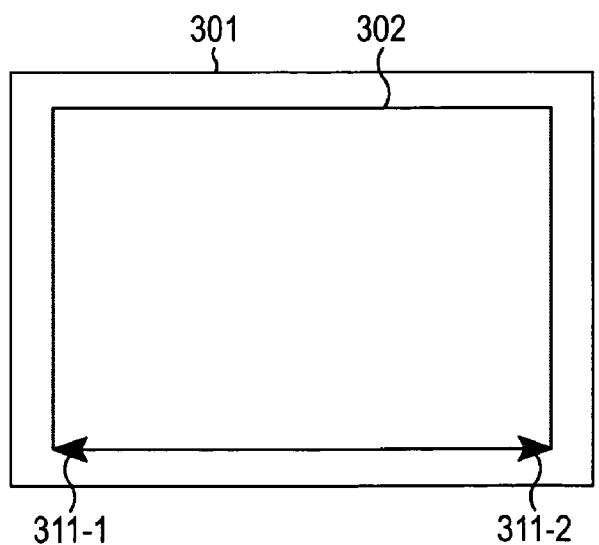
FIG. 13 is an illustration of a template image having no thumbnail areas.

FIG. 13 shows an exemplary template image 301 having no thumbnail areas. The template image 301 includes a display area 302 serving as an area in which thumbnail images are displayed.

The template image 301 further includes icons 311-1 and 311-2 (below the display area 302). For example, the user selects the icon 311-1 using the operation unit 135 to return to the previous page of an index image (or the previous view of the template image 301 including thumbnail images drawn therein or the template image 251) (the index image corresponds to the template image 301 including thumbnail images drawn therein or the template image 251), and selects the icon 311-2 to advance to the next page (or the next view of the template image 301 including thumbnail images drawn therein or the template image 251).

In step S124, the template image creating section 211 stores the template image 301 having no thumbnail areas. Specifically, the template image creating section 211 stores and holds the template image 301 created in step S123 in a predetermined storage region of the RAM 133.

After the processing of step S124, the process ends.

Next, another index image creating process performed by the CPU 131 that executes the index image display control program 201' shown in FIG. 11, which corresponds to the processing of step S71 shown in FIG. 8, will be described with reference to a flowchart of FIG. 14.

Figure 9:
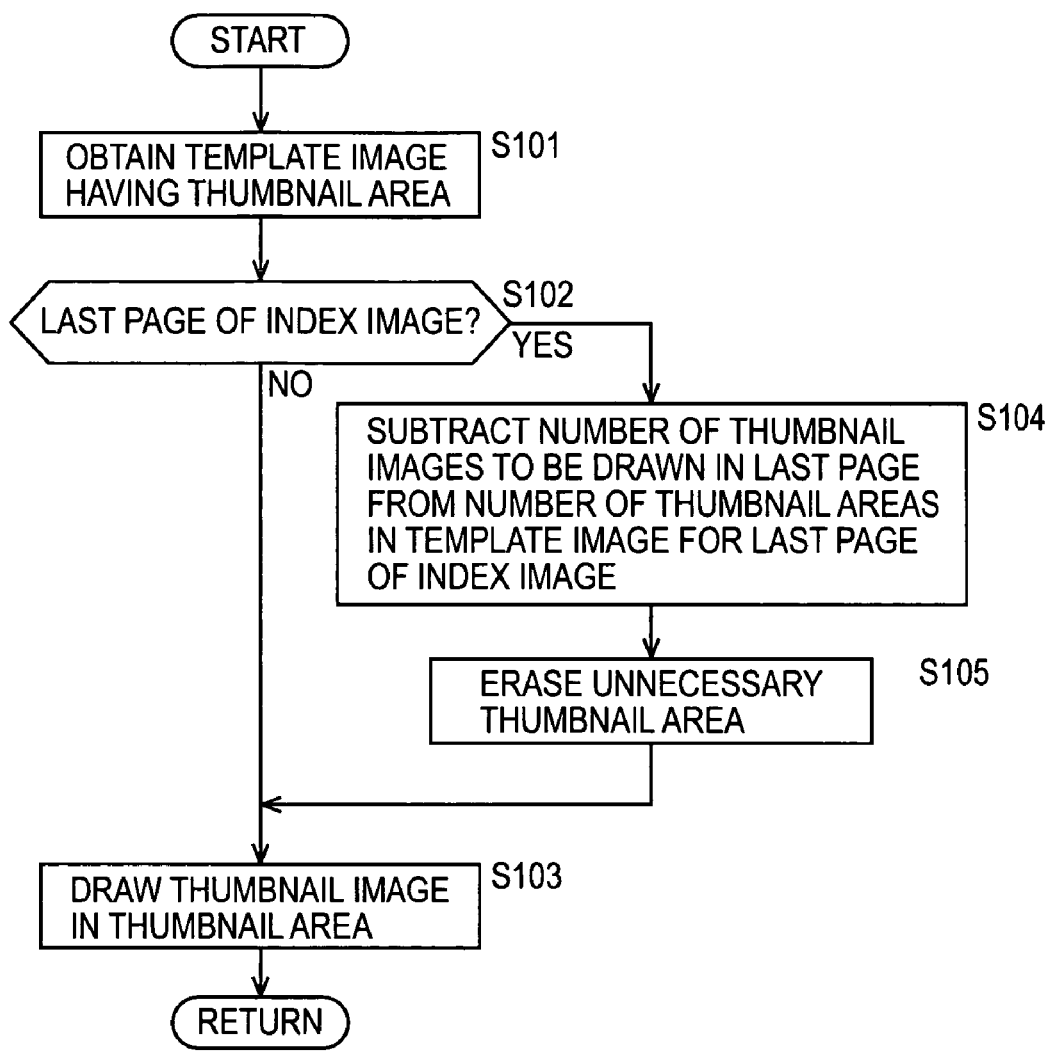
FIG. 9 is a flowchart showing an index image creating process.

The processing of steps S151 and S152 is similar to that of steps S101 and S102 shown in FIG. 9, and a description thereof is thus omitted.

If it is determined in step S152 that the obtained template image 251 is an image on which the last page of the index image is based, the process proceeds to step S153. The processing of step S153 is similar to that of step S103 shown in FIG. 9, and a description thereof is thus omitted.

If it is determined in step S152 that the obtained template image 251 is an image on which the last page of the index image is based, then, in step S154, the thumbnail area creating section 292 determines whether or not the number of thumbnail images to be drawn in the last page of the index image is smaller than half of the number of the thumbnail areas 271 placed in the template image 251. That is, the thumbnail area creating section 292 determines whether or not the number ("n") of thumbnail images to be drawn in the last page is smaller than half ("m/2") of the number ("m") of the thumbnail areas 271 placed in the template image 251 (i.e., n<m/2).

If it is determined in step S154 that the number of thumbnail images to be drawn in the last page of the index image is smaller than half of the number of the thumbnail areas 271 placed in the template image 251, i.e., in the example shown in FIG. 10, four, for example, when the number of thumbnail images to be drawn in the last page is two, then, in step S155, the template image obtaining section 212 obtains the template image 301 having no thumbnail areas.

Specifically, the template image obtaining section 212 obtains the template image 301 in step S124 shown in FIG. 12 by, for example, keeping (copying) the template image 301 stored in the predetermined storage region of the RAM 133 to another storage region of the RAM 133 different from the storage region used in step S124 shown in FIG. 12.

In step S156, the thumbnail area creating section 292 creates in the template image 301 having no thumbnail areas a number of thumbnail areas corresponding to the number of thumbnail images to be drawn in the last page.

Figure 15:
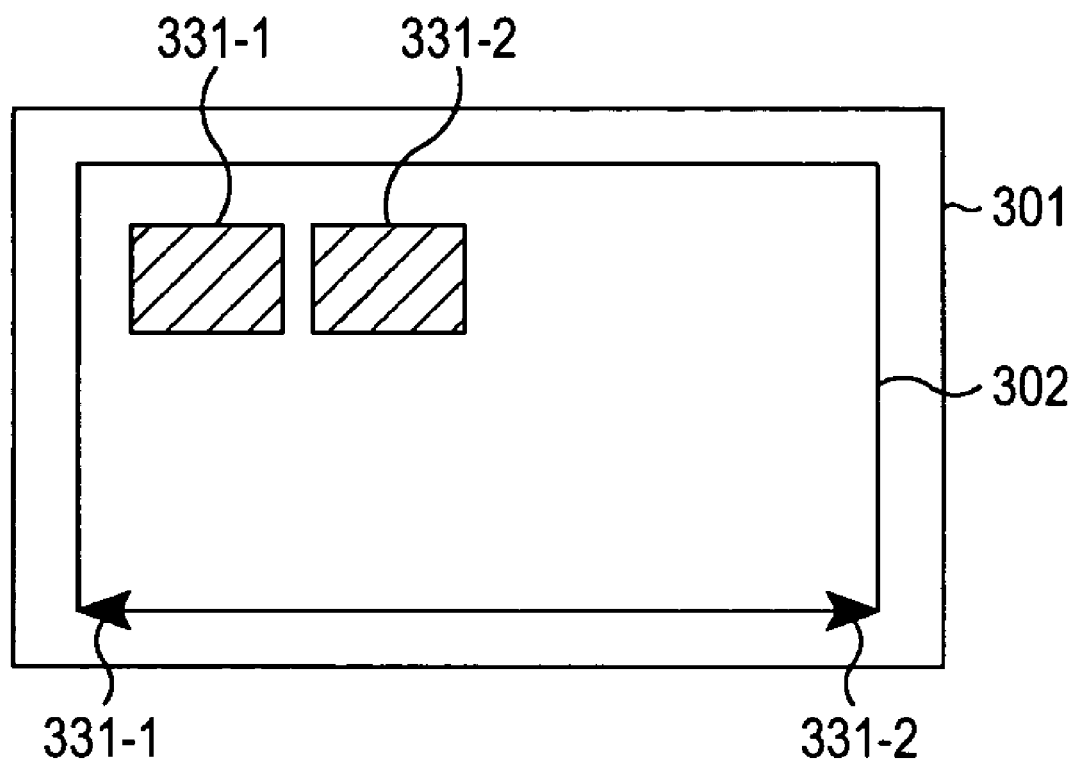
FIG. 15 is an illustration of a template image in which thumbnail areas are created.

FIG. 15 shows the template image 301 having thumbnail areas 331-1 and 331-2 created therein. For example, when the number of thumbnail images to be drawn in the last page is two, as shown in FIG. 15, the thumbnail areas 331-1 and 331-2 are created in the template image 301 in step S156. The thumbnail areas 331-1 and 331-2 are areas onto which thumbnail images are drawn, and are shown in, for example, black by setting the pixel value of the images placed in these areas to 0.

In the following description, the thumbnail areas 331-1 and 331-2 are referred to simply as "thumbnail areas 331" unless they need to be distinguished from each other.

After the processing of step S156, the process returns to step S153, and the thumbnail image drawing section 214 draws thumbnail images in the thumbnail areas 331-1 and 331-2 of the template image 301 that are created in step S156.

If it is determined in step S154 that the number of thumbnail images to be drawn in the last page is not smaller than half of the number of thumbnail areas 271 placed in the template image 251, the process proceeds to step S157.

The processing of steps S157 and S158 is similar to that of steps S104 and S105 shown in FIG. 9, and a description thereof is thus omitted.

After the processing of step S158, the process returns to step S153, and the thumbnail image drawing section 214 draws thumbnail images in the thumbnail areas 271 remaining in the template image 251 which are not erased in step S157.

After the processing of step S153, the process returns to step S72 shown in FIG. 8, and the processing discussed above is performed.

In step S154, it is determined whether or not the number of thumbnail images to be drawn in the last page is smaller than half of the number of the thumbnail areas 271 of the template image 251. It may be determined whether or not half of the number of the thumbnail areas 271 is included by comparing the processing time for creating the thumbnail areas 331 in the template image 301 having no thumbnail areas with the processing time for erasing the unnecessary thumbnail areas 271 from the template image 251 having thumbnail areas placed therein in advance.

For example, if the processing time for creating the thumbnail areas 331 in the template image 301 having no thumbnail areas is shorter than the processing time for erasing the unnecessary thumbnail areas 271 from the template image 251 having thumbnail areas, when the template image 251 includes an even number of thumbnail areas 271, it may be determined in step S154 whether or not the number of thumbnail images to be drawn is equal to or smaller than half of the number of the thumbnail areas 271.

Figure 14:
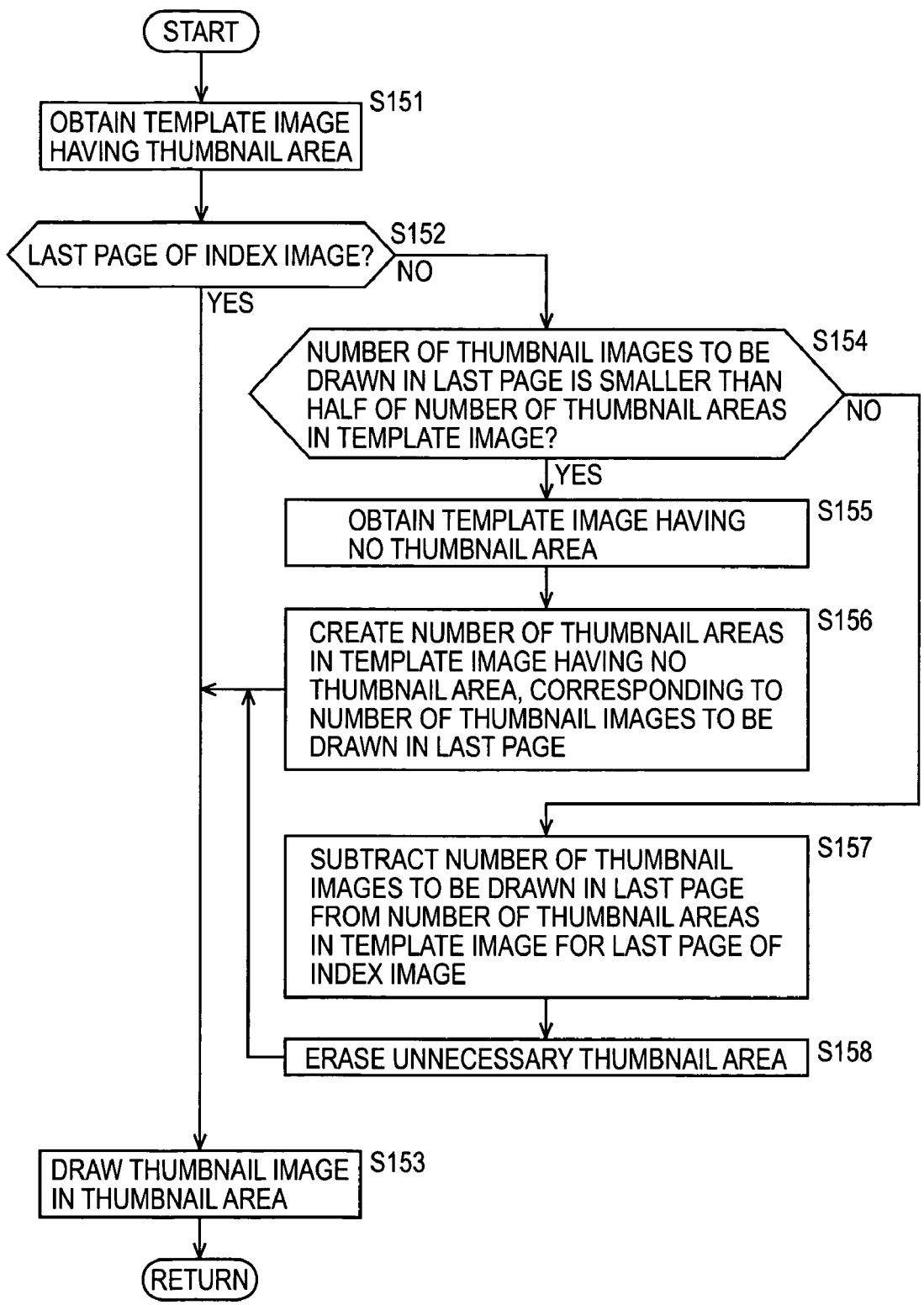
FIG. 14 is a flowchart showing another index image creating process.

Since the processing time for erasing a thumbnail area depends on the design of an image to be drawn in the thumbnail area, the determination in step S154 shown in FIG. 14 may be performed based on a predetermined value rather than half of the number of thumbnail areas of the template image having thumbnail areas placed therein in advance.

The processing time for erasing one thumbnail area and the processing time for creating one thumbnail area may be recorded in advance. In this case, the processing time for erasing all unnecessary thumbnail areas and the processing time for creating all necessary thumbnail areas are calculated for every thumbnail image to be drawn.

When the processing time for erasing all unnecessary thumbnail areas is shorter, the template image 251 is selected, thumbnail areas are erased, and an image including thumbnail images is created. When the processing time for creating all necessary thumbnail areas is shorter, the template image 301 is selected, thumbnail areas are created, and an image including thumbnail images is created.

In this way, the template image 251 having the thumbnail areas 271 and the template image having no thumbnail areas are created and stored (held) in a memory. In response to an instruction from the user to display an index image including thumbnail images drawn therein, thumbnail images are drawn in the thumbnail areas 271.

Therefore, in the pages other than the last page of the index image, thumbnail images are merely drawn in the template image 251 having the thumbnail areas 271 that is stored in the memory.

In the last page of the index image, if the number of thumbnail images to be drawn in the last page is smaller than half of the number of the thumbnail areas 271 placed in the template image 251, the thumbnail areas 331 are created in the template image 301 having no thumbnail areas, and thumbnail images are drawn in the thumbnail areas 331.

In the last page of the index image, if the number of thumbnail images to be drawn in the last page is greater than half of the number of the thumbnail areas 271 placed in the template image 251, the thumbnail areas 271 in which no thumbnail image is to be drawn are erased before thumbnail images are drawn in the template image 251.

Accordingly, thumbnail areas are not created each time an instruction to display an index image is issued, but the template images 251 and 301 are created and stored in advance in the RAM 133. Thus, a large-capacity storage device is not necessary, and the time required for creating an image including thumbnail images can be reduced. That is, it is possible to more rapidly display an image including thumbnail images without a large-capacity storage device.

For example, in order to create an index image, given a template image capable of displaying up to N thumbnail images, three template images consisting of a template image having N thumbnail areas, a template image having N/2 thumbnail areas, and a template image having no thumbnail areas may be created and held in advance in a memory.

In this case, in response to an instruction to display an index image, in the last page of the index image, a template image which needs a short processing time for creating a thumbnail area or for deleting a thumbnail area is selected from the three template images to create an index image.

The display control apparatus according to an embodiment of the present invention is not limited to the digital still camera 100 shown in FIG. 1, and may be any display control apparatus capable of recording and reading control of recording media. A display control apparatuses according to an embodiment of the present invention may be implemented as, for example, a personal digital assistant (PDA), a portable telephone, or a digital electric appliance (e.g., a hard disk recorder).

An image including thumbnail images, which is created in the manner described above, allows a user to rapidly search for a desired image. A first image having a predetermined number of drawing areas each onto which a thumbnail image is drawn is created. In response to an instruction from the user to display the first image, a number of drawing areas corresponding to a number given by subtracting the number of thumbnail images to be drawn in the first image from the predetermined number of the drawing areas of the first image are erased from the first image, and thumbnail images are drawn in the unerased drawing areas remaining in the first image. Display of the first image including the thumbnail image drawn in each drawing area is controlled. Therefore, the image including the thumbnail images can be more rapidly displayed.

The aforementioned series of processes may be implemented by hardware or software. When the series of processes is implemented by software, a program constituting the software is installed into a computer having the program incorporated in specific hardware or an apparatus capable of various functions by installing various programs from a recording medium, e.g., a general-purpose personal computer.

This recording medium may be implemented as a packaged medium recording the program, which is distributed separately from the computer to the user for providing the program, such as the removable medium 146 shown in FIG. 4, e.g., a magnetic disc (including a flexible disc), an optical disc (including a compact disk read-only memory (CD-ROM) and a digital versatile disc (DVD)), a magneto-optical disc (including MD (Mini Disc) (trademark)), or a semiconductor memory. The recording medium may also be implemented as a medium recording the program, which is distributed to the user as being incorporated in advance in the computer, such as a ROM or a hard disk.

The program for performing the aforementioned series of processes may be installed into the computer via an interface, such as a router or a modem, if necessary, over a wired or wireless communication medium, such as a local area network, the Internet, or digital satellite broadcasting.

In this document, the steps describing the program to be stored in a recording medium may include not only the processes performed in a time-series manner according to the described order but also the processes that are performed not in a time-series manner but in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
   image creating means for creating a first template image as a page from an index of images, the first template image having a predetermined number of drawing areas without corresponding thumbnail images, wherein the drawing areas visually identify portions of the first template image onto which at least one thumbnail image will be drawn;
   means for receiving an instruction from a user to display the first template image;

means for determining whether or not the first template image is a last page of the index of images to be displayed; and means for determining whether or not the number of thumbnail images to be drawn in the first template image is greater than or equal to half of the predetermined number of drawing areas;

wherein if the number of thumbnail images to be drawn in the first template image is greater than or equal to half of the predetermined number of drawing areas, the display control apparatus further comprises:

erasing means for erasing at least one drawing area from the first template image if the first template image is determined to be the last page of the index of images to be displayed, wherein the number of drawing areas erased is determined by subtracting the number of thumbnail images to be drawn in the first template image from the predetermined number of drawing areas of the first template image;

drawing means for drawing a thumbnail image in remaining drawing areas of the first template image; and display means for displaying the first template image including the thumbnail image drawn in each remaining drawing area.

2. The display control apparatus according to claim 1, wherein if the number of thumbnail images to be drawn in the first template image is less than half of the predetermined number of drawing areas the image creating means creates a second template image without drawing areas, and the display control apparatus further comprises:

means for determining that the number of thumbnail images to be drawn in the first template image is smaller than half of the predetermined number of drawing areas of the first template image, area creating means for creating at least one drawing area in the second template image having no drawing areas, wherein the number of drawing areas created corresponds to the number of thumbnail images to be drawn, wherein the drawing means draws a thumbnail image in each of the at least one drawing area created in the second template image.

3. The display control apparatus according to claim 1, wherein the blank drawing areas are displayed in one of a hatching pattern or black.

4. A display control method for a display control apparatus, the method comprising the steps of:

creating a template image as a page from an index of images, the template image having a predetermined number of drawing areas without corresponding thumbnail images, wherein the drawing areas visually identify portions of the template image onto which at least one thumbnail image will be drawn;

receiving an instruction from a user to display the template image;

determining whether or not the template image is a last page of the index of images to be displayed;

determining whether or not the number of thumbnail images to be drawn in the template image is greater than or equal to half of the predetermined number of drawing areas;

wherein if the number of thumbnail images to be drawn in the template image is greater than or equal to half of the predetermined number of drawing areas, the method further comprises:

erasing at least one drawing area from the template image if the template image is determined to be the last page of the index of images to be displayed, wherein the number of drawing areas erased is determined by subtracting the number of thumbnail images to be drawn in the template image from the predetermined number of drawing areas of the template image;

drawing a thumbnail image in remaining drawing areas of the template image; and displaying the template image including the thumbnail image drawn in each remaining drawing area.

5. The display control method of claim 4, wherein the drawing areas are displayed in one of a hatching pattern or black.

6. A recording medium recording a computer-readable program for causing a processor to perform a display control method for a display control apparatus, the method comprising:

creating a template image as a page from an index of images, the template image having a predetermined number of drawing areas without corresponding thumbnail images, wherein the drawing areas visually identify portions of the template image onto which at least one thumbnail image will be drawn;

receiving an instruction from a user to display the template image;

determining whether or not the template image is a last page of the index of images to be displayed;

determining whether or not the number of thumbnail images to be drawn in the template image is greater than or equal to half of the predetermined number of drawing areas;

wherein if the number of thumbnail images to be drawn in the template image is greater than or equal to half of the predetermined number of drawing areas, the method further comprises:

erasing at least one drawing area from the template image if the template image is determined to be the last page of the index of images to be displayed, wherein the number of drawing areas erased is determined by subtracting the number of thumbnail images to be drawn in the template image from the predetermined number of drawing areas of the template image;

drawing a thumbnail image in remaining drawing areas of the template image; And displaying the template image including the thumbnail image drawn in each remaining drawing area.

7. The recording medium of claim 6, wherein the drawing areas are displayed in one of a hatching pattern or black.

8. A display control apparatus comprising:

image creating section configured to create a template image as a page from an index of images, the template image having a predetermined number of drawing areas without corresponding thumbnail images, wherein the drawing areas visually identify portions of the template image onto which at least one thumbnail image will be drawn;

receiving section configured to receive an instruction from a user to display the template image;

first determining section configured to determine that the template image is a last page to be displayed;

second determining section configured to determine whether or not the number of thumbnail images to be drawn in the template image is greater than or equal to half of the predetermined number of drawing areas;

wherein if the number of thumbnail images to be drawn in the template image is greater than or equal to half of the predetermined number of drawing areas, the display control apparatus further comprises:

erasing section, executing on a processor, configured to erase at least one drawing area from the template image if the template image is determined to be the last page to be displayed, wherein the number of drawing areas erased is determined by subtracting the number of thumbnail images to be drawn in the template image from the predetermined number of drawing areas of the template image;

drawing section configured to draw a thumbnail image in remaining drawing areas of the template image; and display section configured to display, on a display device, the template image including the thumbnail image drawn in each remaining drawing area.

9. The display control apparatus of claim 8, wherein the drawing areas are displayed in one of a hatching pattern or black.

* * * * *

UNITED STATES PATENT AND TRADEMARK OFFICE
CERTIFICATE OF CORRECTION

PATENT NO. : 7,650,578 B2  Page 1 of 1
APPLICATION NO. : 11/294388
DATED : January 19, 2010
INVENTOR(S) : Ryoko Shimokawa It is certified that error appears in the above-identified patent and that said Letters Patent is hereby corrected as shown below:

In claim 6, column 18, line 45, "And" should read --and--.

Signed and Sealed this

Fourth Day of May, 2010

David J. Kappos
*Director of the United States Patent and Trademark Office*